United States Patent
Woerrlein

[15] 3,680,100
[45] July 25, 1972

[54] RANDOMLY PHASE CODED ANTENNA TECHNIQUE FOR SEARCH RADAR

[72] Inventor: Hermann H. Woerrlein, Dunkirk, Md.
[73] Assignee: The United States of America as represented by the Secretary of the Navy
[22] Filed: Dec. 15, 1970
[21] Appl. No.: 98,248

[52] U.S. Cl...........................343/11 R, 343/16 R, 343/18 E, 343/100 CL
[51] Int. Cl.......................................................G01s 9/06
[58] Field of Search..........343/10, 11 R, 16 R, 18 E, 100 SA, 343/100 CL

[56] References Cited
UNITED STATES PATENTS
3,546,700  12/1970  Rihaczek.........................343/100 SA Primary Examiner—T. H. Tubbesing
Attorney—R. S. Sciascia and Arthur L. Branning

[57] ABSTRACT

A search radar having an array antenna wherein the individual antenna array elements are energized by random phases having a beam forming matrix to sense direction dependent phase codes in the antenna far field, which phase codes are in turn used in correlation processing in the radar receiver for the purpose of obtaining angular resolution and radar sensitivity.

11 Claims, 5 Drawing Figures

FAR FIELD = $\sum_{k=1}^{k=n} E_k e^{j2\pi \frac{X_k}{\lambda}(\sin\theta - \sin\theta_0)}$ FAR FIELD = $\sum_{k=1}^{k=n} E_k e^{j(2\pi \frac{X_k}{\lambda}\sin\theta + \phi_k)}$

INVENTOR.
HERMANN H. WOERRLEIN
BY
ATTORNEY

RANDOMLY PHASE CODED ANTENNA TECHNIQUE FOR SEARCH RADAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

As radars have become more sophisticated, the use of both specialized radar systems and of specialized modes of operation of a particular radar have become commonplace. When used for the surveillance of a large area, as contrasted to the tracking of a single target, radar systems or modes of operation are often termed "search" or "scanning" and are characterized by rather rapid steering of a high intensity (power) radar beam, or an antenna main lobe, throughout the volume under surveillance. Since a particular target is illuminated by the radar beam during only a small fraction of the scanning period, the energy reflected to the receiver by a target is small, despite the use of the high power beam.

Search radars often use array antennas wherein the individual antenna elements are energized with a controlled phase relation to each other for the purpose beam forming and steering. Considerable difficulty, particularly when using higher frequencies and/or active radiating elements, is often experienced in maintaining the stability of the phase control and many microwave sources are now considered not suited for use with array antennas because the present state of the art does not allow the precise phase control which is necessary.

Another disadvantage of the presently used search radar is the relative ease with which an enemy can intercept the presence of the radar surveillance because of the periodic, intermittent incidence of the high power search radar beams.

SUMMARY OF THE INVENTION

The general purpose of this invention is to provide a search radar which embraces all of the advantages of similarly employed radar and possesses none of the aforedescribed disadvantages. To attain this, the invention contemplates a search radar having an array antenna wherein the individual antenna array elements are energized by random phases and wherein angular resolution is obtained by using a beam forming matrix to sense direction dependent phase codes in the antenna complex far field, which phase codes are in turn used in correlation processing in the radar receiver. More-or-less conventional range gate and display sections are also included in the invention.

OBJECTS OF THE INVENTION

It is, therefore, an object of the invention to provide an improved search radar.

Another object is the provision of an improved search radar which includes an array antenna wherein the individual elements are energized by random phases.

Yet another object of the present invention is to provide an improved search radar which includes an array antenna wherein the individual elements are energized by random phases and wherein angular resolution is obtained by using a beam forming matrix to sense directional phase codes in the antenna far field and using these sensed directional phase codes in correlation processing the receiver signal.

A still further object of this invention is to employ techniques in the field of array antenna, search radar which do not require phase control of the individual elements and which includes the steps of radiating an electromagnetic field by means of a randomly phase array antenna, of sensing direction dependent codes in the electromagnetic field and of using the sensed codes in correlation processing the radar receiver signal.

DESCRIPTION OF THE DRAWINGS

The exact nature of this invention as well as other objects and advantages thereof will be readily apparent from consideration of the following specification relating to the annexed drawings in which:

FIGS. 1A and 1B are useful in describing prior search radars;

DESCRIPTION OF THE PREFERRED EMBODIMENT

Figure 1B:
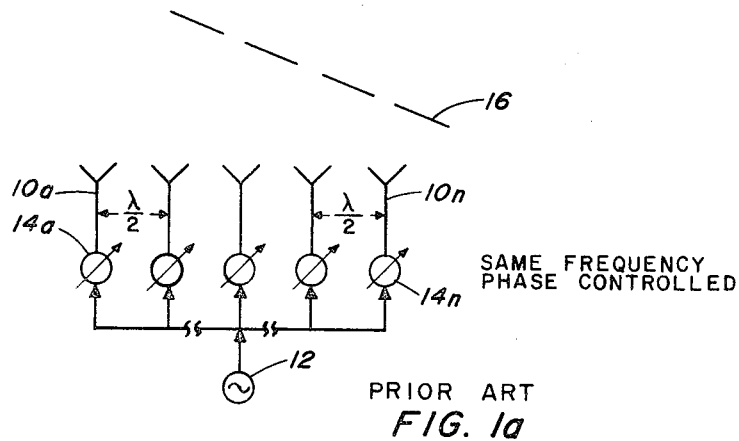

Before proceeding with a description of the present invention, it is considered advisable to discuss several known array antenna concepts, and for this purpose the reader is referred to FIGS. 1A and 1B. In FIG. 1A the array antenna $10a \ldots 10n$ is shown symbolically as consisting of five elements. It should be realized, however, that typically an array antenna will include many more (perhaps hundreds or thousands) elements. These array elements are often energized by a single power source to radiate the same frequency energy. Phase shifters or delay devices $14a \ldots 14n$ precisely relate the phase of the energization of each element to the other elements so that the phase front 16 is formed and directionally steered. When the element spacing is approximately a half wavelength, as shown, and the energization of all elements is in phase, the broadside radiation pattern of the main lobe 18 and side lobes 20 and 22 will occur. The main lobe 18 can be steered from the broadside direction shown through an angle $\theta_o$ by progressively varying, from element to element, the phase of energization by increments of $\pi \sin \theta_o$.

While the above basic concept of the prior art array antennas is much modified in practice, as by varying the amplitude of energization from element to element to reduce the side lobes 20 and 22, the basic concept has been extensively treated mathematically and the complex far field equation is often expressed as the sum of the radiation of the $n$ array elements in the form $$E(\theta) = \sum_{k=1}^{k=n} E_K e^{j\pi \frac{X_k}{\lambda}(\sin \theta - \sin \theta_o)} \qquad (1)$$

where $\theta$ is the angle from the broadside direction $\theta_o$ is the angle the main lobe has been steered from the broadside direction $X_k$ is the location of the $k$-th antenna element $\lambda$ is the wavelength and $E(\theta)$ and $E_k$ are respectively the total far field voltage and the contribution thereto by the $k$-th element of the $n$ element array.

As was previously mentioned, the prior art array antenna radars are disadvantageously characterized as requiring very precise control of the energization of the individual array element, a requirement that limited the choice of energy sources (particularly in the higher frequencies); as being relatively easy for an enemy to detect when it, i.e., the enemy, is under radar surveillance because the searching radar will illuminate a target for only a small fraction of the scanning period using a high power beam.

Figure 2A:
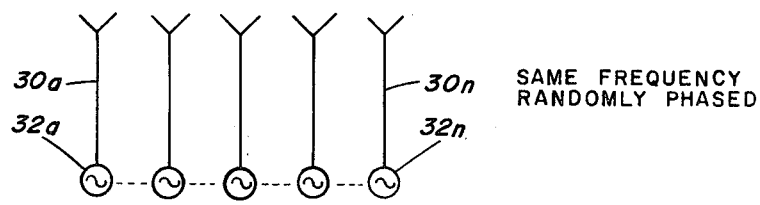
FIGS. 2A and 2B illustrate certain basic concepts of the present invention.
Figure 2B:
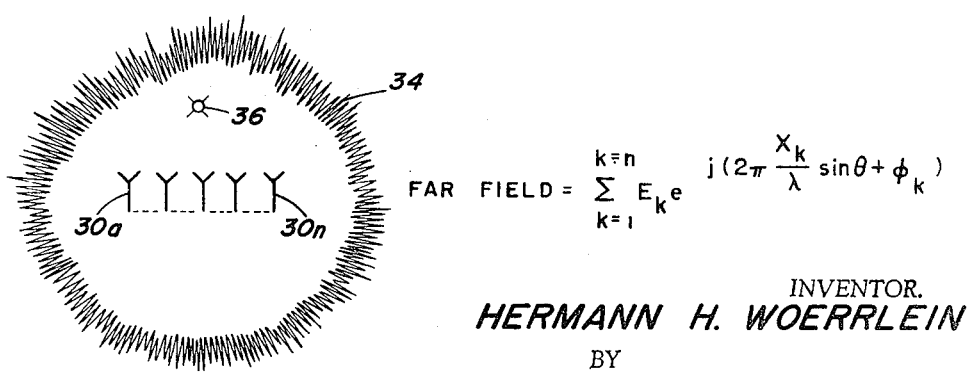

Attention is now directed to FIGS. 2A and 2B which, while somewhat similar to FIGS. 1A and 1B, are useful in symbolically illustrating certain basic concepts of the present invention. In FIG. 2A the array antenna $30a \ldots 30n$ is again shown symbolically as consisting of five elements which the reader should recognize as being representative of a large number which cannot be conveniently drawn. These array elements are shown as individually being energized by sources $32a \ldots 32n$ which are of substantially the same frequency but random phased, i.e., the energization of each of the elements $30a \ldots 30n$ is of random phase with respect to all other elements. The radiation pattern 34 of such a randomly phased array is shown in FIG. 2B and it is, of course, changing from pulse to pulse and without any predominate lobe or systematic directional structure.

Several advantageous operational characteristics are instantly evident concerning the array antenna and radiation pattern of FIGS. 2A and 2B. For example, no difficulty with phase control can occur in the absence of any attempt to precise control phase. Secondly, an enemy target 36 is constantly illuminated by the radiation pattern 34 with the result that for equal average powers of transmission, the target will be illuminated with the same amount of energy (during a period T) for the phase controlled operation of FIGS. 1A and 1B and for the random phase operation of FIGS. 2A and 2B despite the formation of the (focused) beam 18 of FIG. 1B. This can be expressed in equation form as $$\int_0^T P_1 dt = \int_0^T P_2 dt \text{ where } P \text{ is power} \quad (2)$$

and emphasizes that there is basically no advantage to the time inefficient, high intensity beam 18 over the constant illumination of radiation pattern 34, as far as the energy on target in a uniformly scanning search radar is concerned.

Yet another advantageous feature is present in the random phase operation of FIGS. 2A and 2B in that it approaches the concept of "silent radar." Particularly if deceptive practices, such as varying the pulse repetition frequency (prf) and the pulse duration, are used, an enemy will be much more inclined to disregard (as noise or jamming) the random phase illumination of pattern 34 than to ignore the high intensity, recurrent illumination by the focused beam 18.

It may be of some further interest to note that the complex far field pattern 34 of array $30a \ldots 30n$ is in the form $$E(\theta) = \sum_{k=1}^{k=n} E_K e^{j(2\pi \frac{X_K}{\lambda} \sin \theta + \phi_k)} \quad (3)$$

which is somewhat similar to that of Equation (1) and where $\phi_k$ is the random phase of the $k$-th element.

Having recognized the above-described advantages of the randomly phased array antenna radar, there remains the problem of obtaining angular resolution and receiver sensitivity which is necessary to make the radar practical. The solution of this problem constitutes one of the main features of the present invention, a preferred embodiment of which is illustrated in FIG. 3, and utilizes techniques which are somewhat related to the known radar processes of beam forming, pulse compression and signal correlation.

Figure 3:
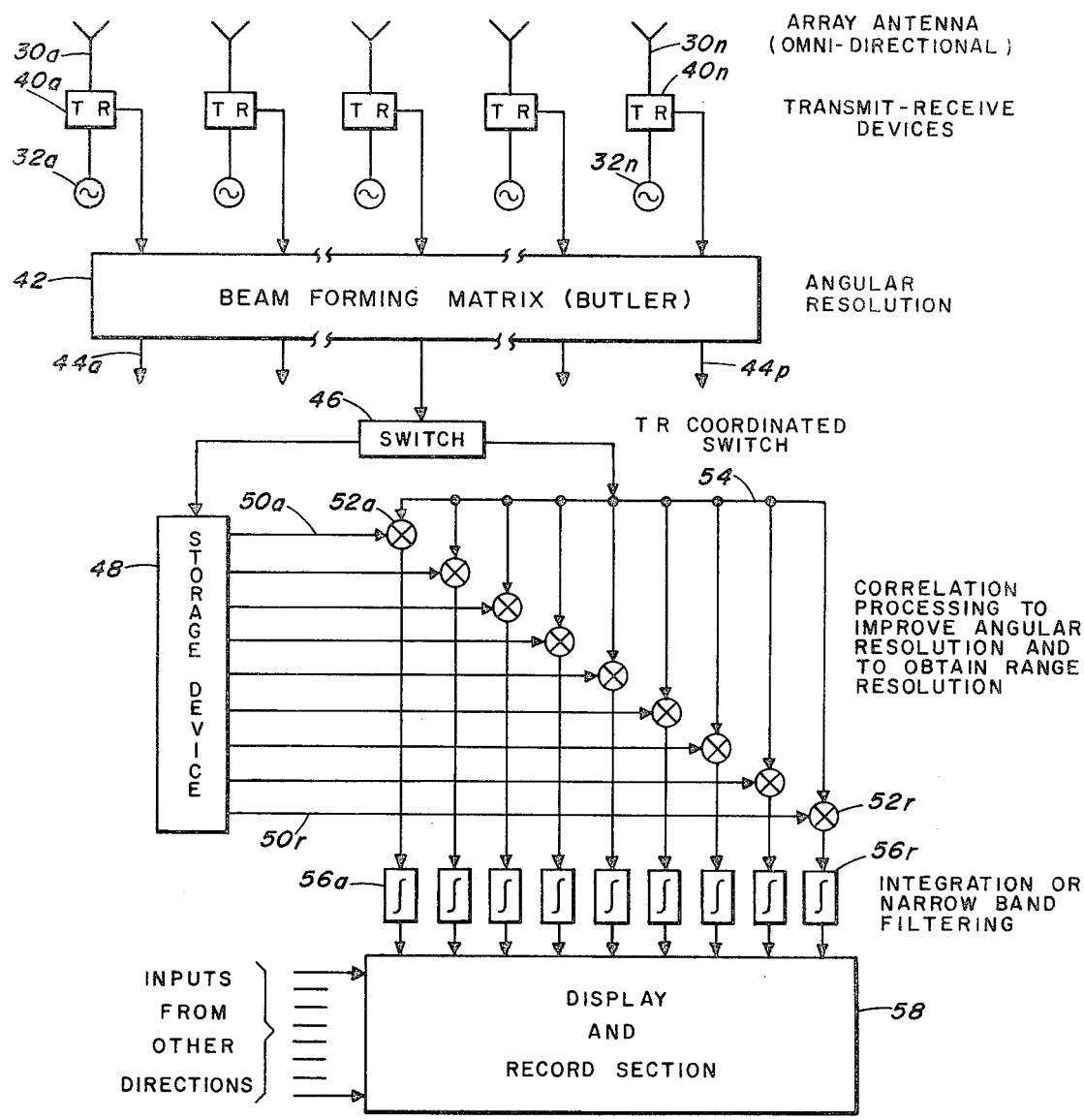
FIG. 3 shows a preferred embodiment of the invention.

Referring now to FIG. 3, the array antenna $30a \ldots 30n$ is preferably arranged in an omni-directional pattern, with the individual radiating elements being energized in a randomly phased manner through transmit-receive (TR) devices $40a \ldots 40n$ by the sources $32a \ldots 30n$ which are of substantially the same frequency but not phase controlled. If convenient, the sources $32a \ldots 32n$ may be a single source, with a random or pseudo random phase codes being impressed in the circuit between the source and the radiating element.

During the transmission portion of the TR cycle, the control of which is by means that are entirely conventional and not illustrated, the TR devices $40a \ldots 40n$ bleed a small portion of the signal transmitted by each array element $30a \ldots 30n$ to a beam forming matrix 42, of which many suitable types are known and which could be of the type known as a Butler Matrix after its originator, J. L. Butler. As is widely known, the matrix 42 provides at its outputs $44a \ldots 44p$ (illustrated as being five in number, but the reader will recognize that more or less outputs can be provided as a matter of design choice and dependent on the size of the array) signals that correspond to the far field pattern of the array $30a \ldots 30n$ in predetermined directions. Readers desiring further information about multiple beam forming matrices are referred to pages 301–303 of the book INTRODUCTION TO RADAR SYSTEMS by Dr. Merrill I. Skolnik, published in 1962 by McGraw-Hill, Inc.

Each of the matrix outputs $44a \ldots 44p$ are connected to similar circuitry. For the sake of clarity and drafting convenience only one such connection is shown in FIG. 3. There an output of the matrix 42 is shown connected to a switch 46 which is coordinated with the operation of the TR devices $40a \ldots 40n$ so that during the transmit portion of the TR cycle the output of matrix is connected to a storage device 48, such as a sample and hold circuit or a delay line or a shift register.

In the case of a simple pulse radar, the storage device stores the complex far field of the transmit cycle during the subsequent receiver cycle. In the case of pulse compression radar the storage device stores the pulse compression code multiplied by the complex far field of the transmit cycle and plays it back during the receive cycle with delays introduced at the taps $50a \ldots 50r$ to correspond to the roundtrip delays of a number of range cells.

Storage device 48 has output taps $50a \ldots 50r$ which are connected to correlation mixers (multipliers) $52a \ldots 52r$. Nine storage device output taps and mixers are shown, but the reader will recognize that this number can vary depending upon the degree of range resolution desired.

During the receive portion of the TR cycle, the array antenna elements $30a \ldots 30n$ are connected by the TR devices $40a \ldots 40n$ to the beam forming matrix 42, an output of which is connected by the TR coordinated switch 46 to a buss 54 which is connected to other inputs of the correlation mixers $52a \ldots 52r$.

The outputs of the mixers $52a \ldots 52r$ are connected to well known means $56a \ldots 56r$ which may include narrow band filters or voltage integrators and which function in the known manner to improve the signal to noise ration (S/N) of the outputs of the correlation mixers $52a \ldots 52r$. The outputs of the means $56a \ldots 56r$ are connected, together with the output of similar means associated with the other outputs $44a \ldots 44p$ of beam forming matrix 42, to a display and record section 58 that can be in any suitable form and which is no per se a part of this invention.

Persons skilled in the electronic arts will understand that, for the purpose of clarity, FIG. 3 is limited to the essentials of the invention and that many conventional operations which would be present in an actual radar according to the invention, such as mixing, filtering, signal frequency changes (r.f. to video), etc., have not been shown.

The operation of the disclosed preferred embodiment (FIG. 3) of the invention is by now probably apparent, but for the purpose of completeness, is now summarized.

Array antenna $30a \ldots 30n$, preferably having the elements arranged in an omnidirectional pattern, is randomly phase energized by sources $32a \ldots 32n$ through the TR devices $40a \ldots 40n$ to form the radiation pattern 34 which can be expressed as in Equation (3).

During the transmission portion of the TR cycle, a small amount of the energization of each of the elements $30a \ldots 30n$ is bled from the TR devices $40a \ldots 40n$ to the (Butler) beam forming matrix 42 which functions to synthesize on the output leads $44a \ldots 44p$ the varied complex far field radiation patterns at different directions (i.e., at different values of $\theta$). During the receive portion of the TR cycle all of the energy received by the elements $30a \ldots 30n$ is connected by the TR devices $40a \ldots 40n$ to the matrix 42 which now operates in the more conventional manner of placing the reflected energy on the appropriate output lead $44a \ldots 44p$ according to the direction from which the energy is received, i.e., of producing angular resolution and receiver antenna gain.

Recalling that all of the outputs $44a \ldots 44p$ are similarly connected to switches 46 which are coordinated with the TR cycle to connect the output of the matrix 42 to the storage element 48 during the transmit portion of the cycle and to the buss 54 during the receive portion of the cycle. Range resolution and increased angular resolution are obtained by connecting the progressive output taps of the storage device to one input of the correlation mixers $52a \ldots 52r$, the other inputs of which are connected to the buss 54 and the outputs of which are connected to means $56a \ldots 56r$ which function to improve the S/N by integration (storage) or narrow band filtering techniques.

It is worthy of emphasis that the correlation process functions both to improve the angular resolution obtained by matrix 42 and to provide range resolution by correlation processing, since only received signals on buss 54 which have the same directional pattern and occur simultaneously with the delayed reference signal on taps $50a \ldots 50r$ will correlate to produce outputs in the means $56a \ldots 56r$. All other signals will decorrelate and produce no output signals.

Outputs from the means $56a \ldots 56r$, and from the similar means associated with other directions in the radar far field, are displayed and recorded as desired in the section 58.

It may occur to the reader that the operation of the present invention is broadly comparable to previously known pulse compression techniques in that the radiated pattern 34 is analogous to the expanded signal and the angular resolution is obtained by correlating the stored sample and the received signals.

There has been disclosed an invention which employs techniques in the field of array antennas, search radar which does not require the precise phase control of the individual antenna elements and which includes obtaining angular resolution by using a beam forming matrix to sense directional phase codes in the antenna far field and using these sensed directional phase codes in correlation processing the received signal.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A method of detecting a target by radar, comprising the steps of:
   energizing a plurality of antenna elements so that each element radiates energy at substantially the same frequency as the other of said plurality of elements but at a phase which is controlled by a random or pseudo random process, said plurality of antenna elements thereby producing a total far field radiation pattern which is randomly changing, in time and in space, and which is substantially free of predominate lobes;
   synthesizing a multiplicity of signals which are representative of the directionally phase coded complex far field radiated by said plurality of antenna elements;
   receiving energy reflected by one or more targets in said far field radiated pattern and
   resolving the return from said targets at certain angles from all other returns by correlation processing, namely by correlating the received signals with the multiplicity of synthesized signals
   whereby a successful correlation of reflected signals with synthesized signals is indicative of the presence and direction of said targets in said far field pattern.

2. A "silent" radar system comprising:
   antenna means for radiating energy to form a far field pattern that is directionally phase coded and randomly changing, in time and in space, and which is substantially free of predominate lobes;
   beam forming matrix means connected to said antenna means and having a plurality of outputs and functioning to produce signals at said plurality of outputs which are alternately representative of said radiated complex far field, the signals of individual outputs of said plurality of outputs being related to different directions from said antenna means and
   range resolution and correlation processing means connected to each of said plurality of outputs and functioning to provide a signal informative of the presence, range, and angular coordinates of a target when correlation occurs between the signals representative of the radiated far field pattern and of the received radar signal.

3. The "silent" radar of claim 2 wherein said radiated energy is varied in pulse repetition frequency and also because said far field pattern is substantially free of predominate lobes, the personnel on said targets are more likely to regard said "silent" radar surveillance as being noise or jamming.

4. The "silent" radar of claim 2 wherein said range resolution and correlation processing means includes a switching means, a storage device having a multiplicity of output taps and a multiplicity of correlation mixers connected to said multiplicity of output taps, said switching means being controlled to connect each of said plurality of outputs to said storage device when said antenna means is radiating energy and to connect each of said plurality of outputs to said multiplicity of correlation mixers when said antenna means is not radiating energy.

5. The "silent" radar of claim 4 wherein said antenna means includes a plurality of array antenna elements, each element of which is connected through a transmit-receive (TR) means to a source of energy.

6. The "silent" radar of claim 5 wherein said TR means has an output which is connected to said beam forming matrix means and functions to connect said antenna elements to said beam forming matrix when said antenna is not radiating energy and to pass to said beam forming matrix a small portion of the energy passing through said TR means when said antenna is radiating energy.

7. The "silent" radar of claim 6 which further includes signal processing means which are connected to the outputs of said multiplicity of correlation mixers and functions to improve the signal-to-noise ratio of said signal informative of the presence, range, and angular coordinates of a target.

8. The "silent" radar of claim 7 which further includes a display and record section connected to said signal processing means.

9. The "silent" radar of claim 8 wherein said beam forming matrix means includes a Butler beam forming matrix.

10. A "silent" radar system comprising:
    antenna means for radiating energy to form a far field pattern that is directionally phase coded and randomly changing, in time and in space, and which is substantially free of predominate lobes;
    beam forming matrix means connected to said antenna means and functioning to sense the directionally phased coding of said far field pattern;
    range resolution and correlation processing means connected to said beam forming matrix means and functioning to provide range resolution by sensing the time when correlation occurs, and
    to provide angular resolution due to the multiplicity of correlation processing channels implemented for different directions.

11. The "silent" radar of claim 10 and further including a display section means connected to said range resolution and correlation processing means and functioning to present a display representative of said provided directional and range resolutions.

* * * * *